(12) United States Patent
Zielinski et al.

(10) Patent No.: US 9,959,690 B2
(45) Date of Patent: May 1, 2018

(54) EXPANDING TIME WINDOW FOR REMOTE COMMANDS

(71) Applicant: Ford Global Technologies, LLC, Dearborn, MI (US)

(72) Inventors: Mark Andre Zielinski, Bloomfield Hills, MI (US); John Russell Bielawski, Jr., Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/189,789

(22) Filed: Jun. 22, 2016

(65) Prior Publication Data

US 2017/0372537 A1 Dec. 28, 2017

(51) Int. Cl.
*G07C 9/00* (2006.01)
*B60R 25/34* (2013.01)

(52) U.S. Cl.
CPC .......... *G07C 9/00023* (2013.01); *B60R 25/34* (2013.01)

(58) Field of Classification Search
CPC ...... G08C 17/02; B60R 25/00; G07C 9/00111
See application file for complete search history.

(56) References Cited

U.S. PATENT DOCUMENTS

| | | | |
|---|---|---|---|
| 4,723,121 A | 2/1988 | Van den Boom | |
| 6,380,842 B1 | 4/2002 | Mattes et al. | |
| 8,594,616 B2 | 11/2013 | Gusikhin et al. | |
| 8,890,654 B2 | 11/2014 | Van Wiemeersch | |
| 8,971,857 B2 | 3/2015 | Nishidai | |
| 2002/0110242 A1 | 8/2002 | Bruwer | |
| 2002/0167417 A1* | 11/2002 | Welles, II | G06Q 30/02 340/691.6 |
| 2009/0128356 A1* | 5/2009 | Nitta | G07C 9/00896 340/4.36 |
| 2009/0129208 A1* | 5/2009 | Weiss | G04R 20/00 368/56 |
| 2013/0077641 A1 | 3/2013 | Burger, Jr. | |

FOREIGN PATENT DOCUMENTS

| | | | |
|---|---|---|---|
| DE | 10202802 A1 | 9/2003 | |
| DE | 102012009491 A1 | 11/2013 | |
| EP | 0698706 A1 * | 2/1996 | ......... G07C 9/00182 |
| GB | 2257552 A | 1/1995 | |
| WO | WO 201456004 A1 | 4/2014 | |

OTHER PUBLICATIONS

Machine Translation of EP 0698706 A1.*
Unpublished pending U.S. Appl. No. 14/991,496 filed Jan. 8, 2016, pursuant to the Comissioner's Notice dated Sep. 21, 2004.
*Embedded Security* (2 Pages) [Online] Retrieved Apr. 2, 2016 from http://microchip.com/design-centers/embedded-security/reference-designs/keelog.
Search Report dated Dec. 7, 2017 for GB Patent Application No. GB 1709874.0 (4 Pages).

* cited by examiner

*Primary Examiner* — Nabil Syed
(74) *Attorney, Agent, or Firm* — James P. Muraff; Neal, Gerber & Eisenberg LLP

(57) ABSTRACT

A vehicle includes: receiver(s), a timer counting time, memory, and processor(s) configured to: receive a time-stamped signal from a fob; compare the timestamp to a time window; reject the timestamp if the timestamp is outside the time window; expand the time window with the counted time; compute the time window as a trigonometric function of the counted time and a predetermined angle.

18 Claims, 6 Drawing Sheets

US 9,959,690 B2

EXPANDING TIME WINDOW FOR REMOTE COMMANDS

TECHNICAL FIELD

This disclosure relates to wireless communication between a base station, such as a vehicle, and a remote device, such as a key fob.

BACKGROUND

Some vehicles are paired with a wireless key fob. These vehicles typically perform an action based on commands sent from the wireless key fob. The vehicle identifies the key fob via a unique key fob ID. The vehicle authenticates the key fob via a rolling code. Authentication via a rolling code is susceptible to a roll jammer (also called a "rolljam") attack, which is discussed in detail below.

SUMMARY

In various embodiments, the present disclosure presents a solution in the form a vehicle including: receiver(s), a timer counting time, memory, and processor(s) configured to: receive a timestamped signal from a fob; compare the timestamp to a time window; reject the timestamp if the timestamp is outside the time window; expand the time window with the counted time; compute the time window as a trigonometric function of the counted time and a predetermined angle.

In various embodiments, the present disclosure presents a solution in the form a system including the above vehicle and the fob. The fob includes a fob timer counting fob time and a dedicated fob battery that exclusively supplies electrical power to the fob timer.

In various embodiments, the present disclosure presents a solution in the form a method of controlling a vehicle including: receiver(s), a timer counting time, memory, and processor(s), the method including, with the processor(s): receiving a timestamped signal from a fob; comparing the timestamp to a time window; rejecting the timestamp if the timestamp is outside the time window; expanding the time window with the counted time.

BRIEF DESCRIPTION OF THE DRAWINGS

For a better understanding of the invention, reference may be made to embodiments shown in the following drawings. The components in the drawings are not necessarily to scale and r elated elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
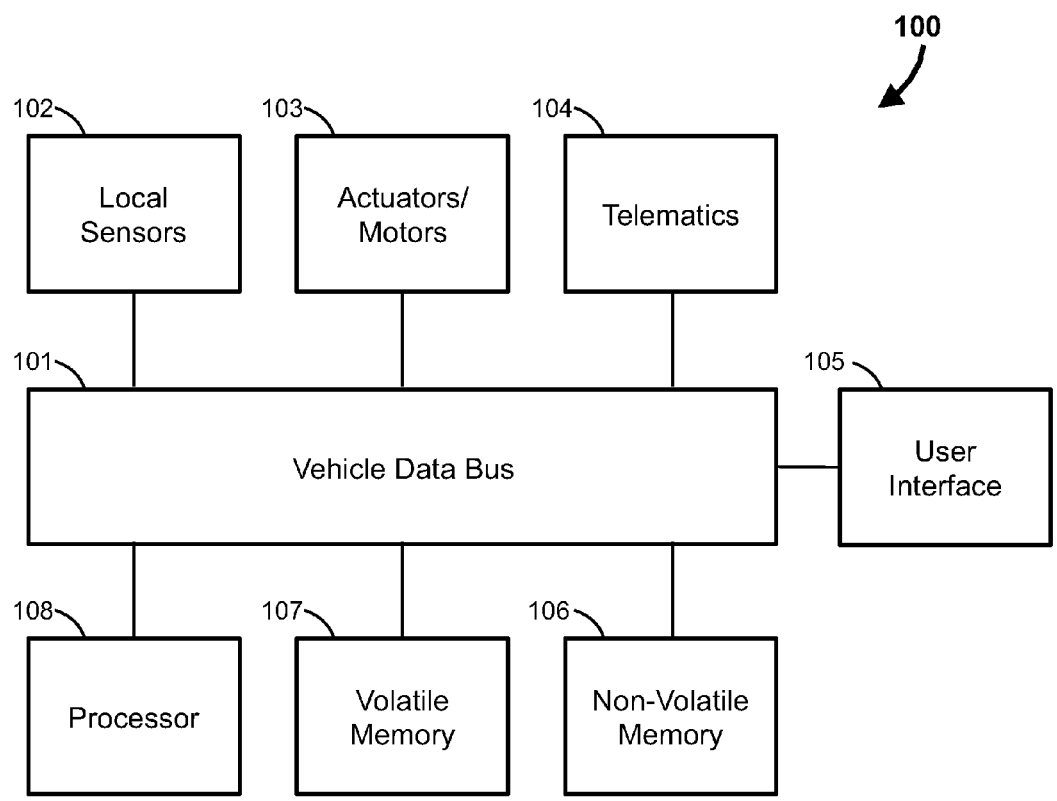
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

FIG. 1 shows a computing system 100 of an example vehicle 215. The vehicle 215 includes a motor, a battery, at least one wheel driven by the motor, and a steering system configured to turn the at least one wheel about an axis. Suitable vehicles 215 are also described, for example, in U.S. patent application Ser. No. 14/991,496, which is hereby incorporated by reference in its entirety. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The actuators/motors 103 produce physical results. Examples of actuators/motors include fuel injectors, windshield wipers, transmissions, airbags, haptic motors, engines, lights (e.g., welcome lights, head lights), etc. The local sensors 102 transmit digital readings or measurements to the processor 108. Examples of suitable sensors include temperature sensors, rotation sensors, seatbelt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in U.S. patent application Ser. No. 14/991,496. In various embodiments, the computing system 100 shares some or all of the features of the vehicle-based computing system pictured in FIG. 1 of U.S. Pat. No. 8,594,616, which is hereby incorporated by reference in its entirety.

It should be appreciated that the vehicle 215 is configured to perform the methods and operations described below. In some cases, the vehicle 215 is configured to perform these functions via computer programs stored on the various volatile or non-volatile memories of the computing system 100. In other words, a processor is configured to perform a disclosed operation when it is in operative communication with memory storing a software program with code or instructions embodying the disclosed operation. Further description of how the processor, memories, and programs cooperate appears in U.S. patent application Ser. No. 14/991,496 and U.S. Pat. No. 8,594,616.

Figure 2:
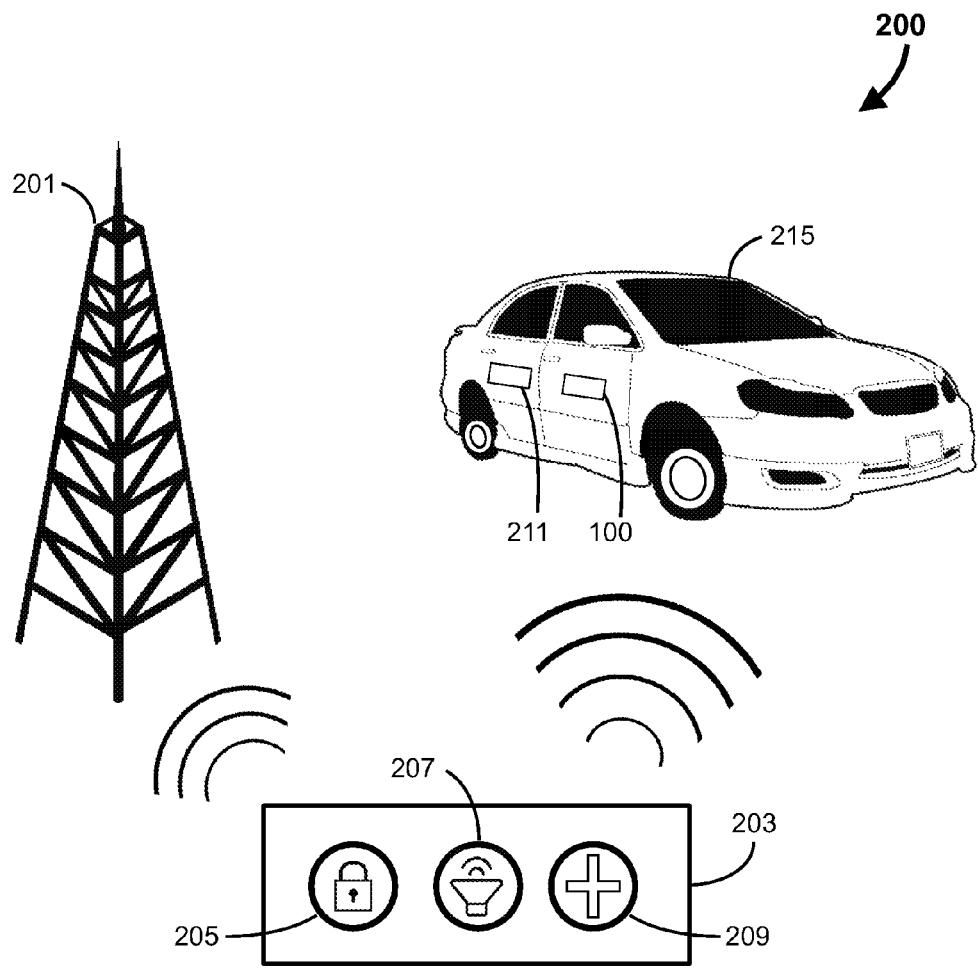
FIG. 2 is a schematic of the vehicle, a key fob paired with the vehicle, and a cell tower.

As described in U.S. Pat. No. 8,594,616, FIG. 2 is a diagram of an exemplary system 200 for a key fob 203. The key fob 203 is equipped with a plurality of buttons. For example, an unlock/lock button 205 enables a vehicle 215 to be locked or unlocked. A panic button 207 enables a user to activate the vehicle's horn and/or headlights. In various embodiments, the key fob 203 and the vehicle 215 communicate via the systems and methods disclosed in U.S. Pat. No. 8,594,616. In various embodiments, the key fob 203 and/or the vehicle 215 share the structure disclosed in U.S. Pat. No. 8,594,616. The key fob 203 and/or the vehicle 215 are configured to directly communicate with a cellular network 201.

As described in U.S. Pat. No. 8,594,616, the key fob 203 communicates with the vehicle 215. The key fob 203 may wirelessly communicate with the vehicle 215 computing system 100 via the telematics unit 104. Alternatively, the key fob 203 may communicate with the vehicle 215 via a dedicated key fob 203 communication device 211 in operative communication with the vehicle computing system 100. Communication between the key fob 203 and the vehicle 215 may be via short-range radio signals or via cellular communication via one or more of the communication device 211 and/or the telematics unit 104. One or more of the communication device 211 and the computing system 100 are connected to a receiver timer (not shown) with a devoted receiver timer battery (not shown). The devoted timer battery is configured to only or exclusively supply power to the receiver timer. The receiver timer counts vehicle time (also referred to as receiver time). Communication between the key fob 203 and the vehicle 215 is described in greater detail below. Although this specification discusses a vehicle 215, it should be appreciated that these methods can be applied to any case with a key fob connected to a base station (e.g., a house, a boat). As discussed below, it should further be appreciated that these methods can be applied to communication between any two electronic devices (e.g., between two mobile devices, between a mobile device and a server, etc.)

Figure 3:
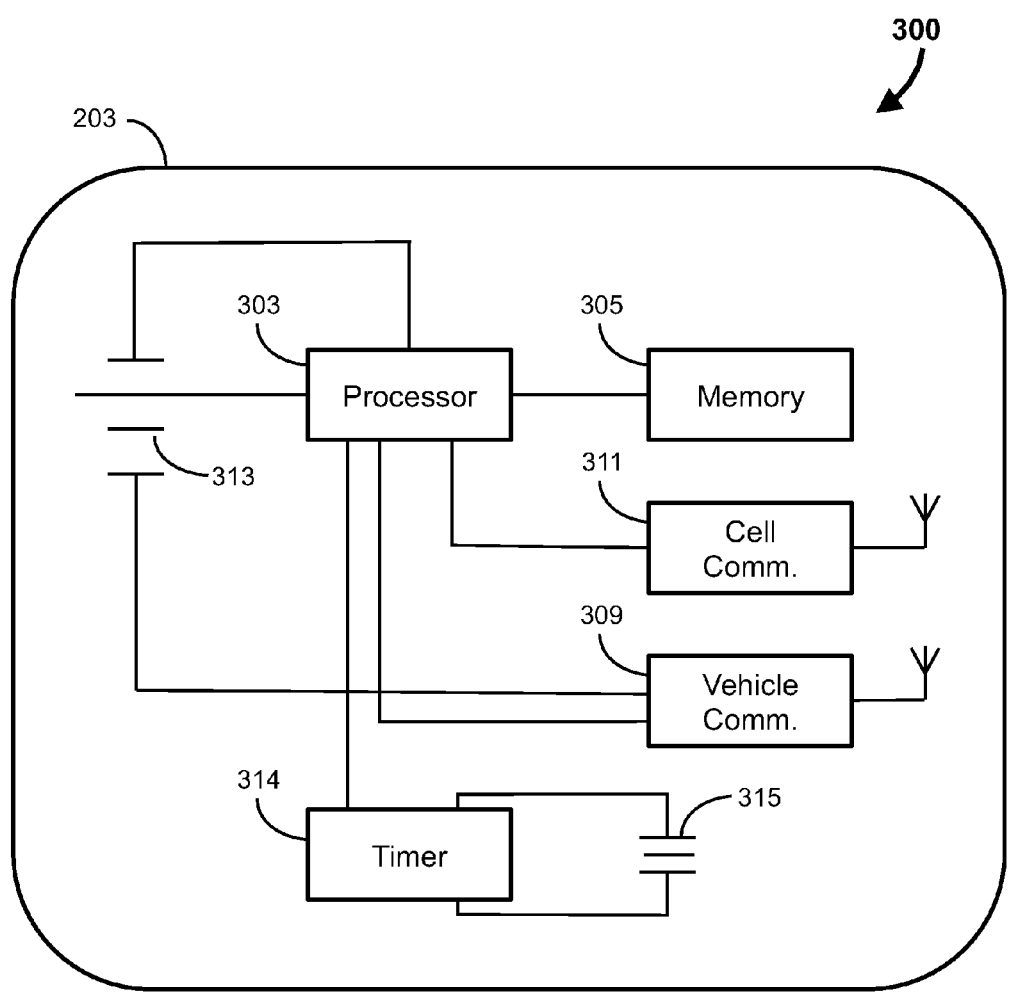
FIG. 3 is a block diagram of the key fob.

FIG. 3 shows electronic components 300 of the key fob 203. The electronic components include a processing unit 303, memory 305, a cell communicator 309, a fob communicator 311, a battery 313, a timer 314, and a devoted timer battery 315. The devoted timer battery 315 is configured to only or exclusively supply power to the timer 314. The fob timer 314 counts fob time. The cell communicator 309 and the fob communicator 311 may include additional hardware components such as transceivers and transponders. In general, the cell communicator 309 is configured to communicate with the cellular network 201. The vehicle communicator 309 is configured to communicate with the vehicle 215 via one or more of the telematics unit 104 and the dedicated key fob communication device 211. The communication may be via any known wireless communication technology including short range radio broadcasts.

Figure 4A:
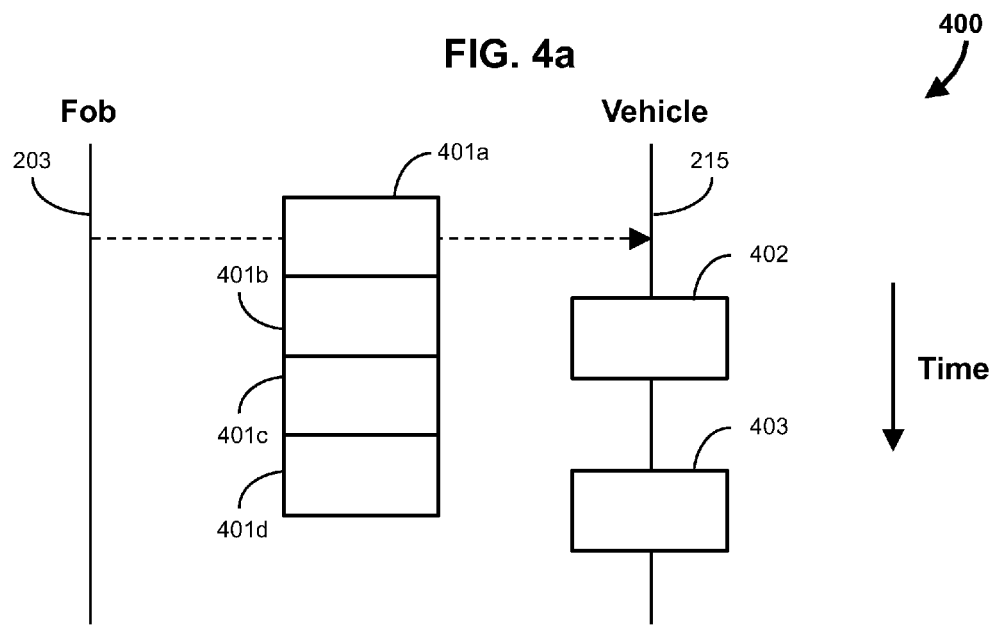
FIG. 4a is a block diagram of communication between the key fob and the vehicle.

FIG. 4a is a block diagram 400 of communication between the key fob 203 and the vehicle 215. When a user generates a command at the key fob 203 (e.g., by pressing lock/unlock button 205), the key fob 203 generates a wireless signal 401 for the vehicle 215. The wireless signal 401 is generated by the vehicle communicator 309. The wireless signal can be a short-range radio signal or a cellular communication routed to the vehicle 215 through the cellular network 201. A prior art wireless signal 401 includes blocks of information 401a, 401b, and 401c. Although three blocks of information are shown, it should be appreciated that the wireless signal 401 may include additional blocks of information. Transmitter ID 401a uniquely identifies the key fob 203. Desired vehicle function 401b is a command for the vehicle generated by the key fob 203, such as a lock command, an unlock command, or vehicle start command. Rolling code 401c is a security mechanism that enables the vehicle 215 to authenticate the wireless message 401. Transmitter ID 401a, desired vehicle function 401b, and rolling code 401c are known in the art. It should be appreciated that all of the blocks of information of a wireless signal 401 may be encrypted as a unit and transmitted as a single block. The blocks can be sequenced in any order. In some cases, the wireless signal 401 is not encrypted, but is paired with digital signature or certificate.

The rolling code 401c is a number generated by the key fob 203 and appended to the wireless signal 401. The vehicle 215 stores a rolling code base (not shown) in the vehicle memory 106 and/or 107. Every time the user generates a command at the key fob 203, the key fob 203 generates a new rolling code 401c with a value greater than every previous rolling code and appends the new rolling code 401c to the wireless signal 401. Rolling code technology is known in the art.

For example, the first time a user generates a command at the key fob 203, the rolling code 401c may be 100. The second time the user generates a command at the key fob, the rolling code 401c may advance to 101. When the vehicle 215 is paired with the key fob 203, the vehicle 215 learns an initial value of the rolling code and stores this value in vehicle memory. When the key fob 203 transmits a valid wireless signal 401 (as determined at block 402) to the vehicle 215, the vehicle 215 updates the rolling code base stored in the vehicle memory 106 and/or 107 to match the rolling code 401c transmitted by the key fob 203.

The vehicle 215 is configured to only authenticate wireless signals 401 with a rolling code 401c greater than the rolling code base stored in the vehicle. For example, if the current rolling code base stored in the vehicle was 800, then the vehicle would only accept wireless transmissions 401 from a key fob having a rolling code 401c of 801 or more. Wireless transmissions 401 from the key fob 203 to the vehicle 215 are encrypted so that it is impractical or substantially impossible for a third party to generate a wireless signal 401 having a particular rolling code (e.g., a rolling code of 1,000,000).

As is known in the art, at block 402, the vehicle 215 processes the wireless signal 401. More specifically, the vehicle 215 compares the unique identifier 401a of the key fob 203 to a list of authorized unique key fob identifiers, stores the desired command 401b, and authenticates the key fob via the rolling code 401c. At block 403, the vehicle 215 executes the desired command 401b (assuming the wireless signal 401 has been identified and authenticated). The functions associated with blocks 402 and blocks 403, as applied to rolling codes, are known in the art.

Figure 4B:
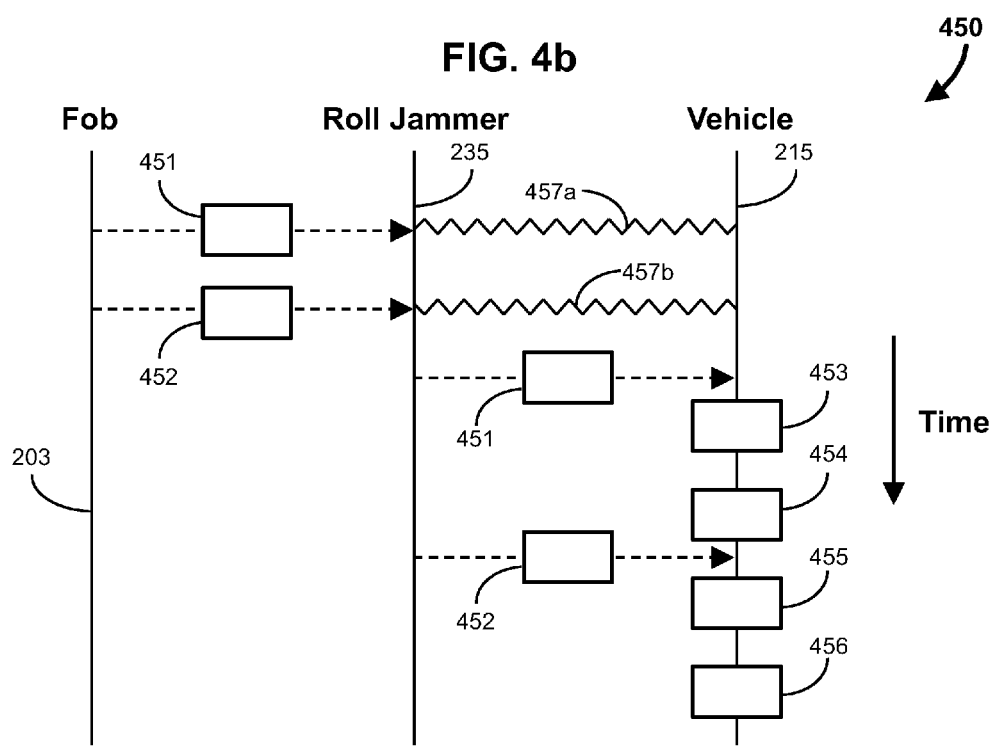
FIG. 4b is a block diagram of a roll jammer (also called a "rolljam") attack.

FIG. 4b is a schematic of a roll jammer (also called "rolljam") attack 450. The roll jammer attack 450 is known in the art. The roll jammer attack 450 is designed to give an unauthorized third party, the roll jammer 235, access to the vehicle 215 by storing and then re-transmitting a valid wireless signal 401 with a valid rolling code 401c. In FIG. 4b, the key fob 203 transmits a valid wireless message 451, such as the wireless message 401. The roller jammer intercepts the wireless message 451, records the wireless message 451, and jams the wireless message with a first signal jam 457a so that the vehicle 215 does not receive the wireless message 451.

The user notices that the vehicle 215 has not performed the command 401b associated with the wireless message 451. The user causes the key fob 203 to generate a second wireless message 452. Again, the roller jammer intercepts the second wireless message 452, records the second wireless message 452, and jams the second wireless message with a second signal jam 457b so that the vehicle 215 does not receive the second wireless message 452.

Shortly thereafter, the roll jammer 235 transmits the stored first wireless message 451 to the vehicle 215. Since the first wireless message 451 is still valid (i.e., includes a valid rolling code 401c), the vehicle 215 authenticates the message at block 453 (which corresponds to block 402 of FIG. 4a) and performs the command 401b associated with the message at block 454 (which corresponds to block 403 of FIG. 4a). This action could be unlocking the vehicle doors. The user incorrectly assumes that the second wireless message 452 transmitted from the key fob 203 caused the vehicle to perform the command 401b.

The roll jammer 235 now possesses a copy of the second wireless message 452. The second wireless message 452 is valid because it includes a rolling code 401c greater than the rolling code 401c of the first wireless message 451. At a later time (e.g., a few hours later), the roll jammer 235 transmits the second wireless message 452 to the vehicle 215. The vehicle 215 authenticates the second wireless message 452 at block 455 and performs the command 401b associated with the second wireless message, such as unlocking the vehicle doors at block 456.

Returning to FIG. 4a and FIG. 7, the present invention is designed to overcome the roll jammer attack by causing the key fob 203 to append a timestamp 401d to each wireless message 401. The timestamp 401d is the current time of the key fob timer 314. The timestamp 401d is integrated into the wireless signal 401 in addition to (or instead of) the rolling code 401c. The vehicle 215 compares the timestamp 401d to the receiver time 701 (i.e., the vehicle time) at block 402. If the timestamp 401d is stale (i.e., outside of a time window 700), then the vehicle 215 rejects the timestamp 401d and declines to authenticate the wireless signal 401 at block 402.

Turning to the roll jammer attack 450 of FIG. 4b, the roll jammer 235, given the present invention, can still store the second wireless signal 452 and rebroadcast the second wireless signal 452 at any time. However, given the present invention, the roll jammer 235 must rebroadcast the second wireless signal 452 within the time window 700 to successfully attack the vehicle 215. If the time window 700 is small enough (e.g., 3 seconds), then the roll jammer attack 450 is impractical because the user (i.e., vehicle driver) is likely to be within viewable distance of the vehicle 215 during the time window 700. The user would thus observe the roll jammer 235 unlocking the vehicle 215. As described above, if the roll jammer 235 replayed the second wireless signal 452 at a later time exceeding the time window 700 (e.g., after enough time elapsed for the user to walk away from the vehicle 215), the vehicle 215 would reject the timestamp 401d.

Figure 7:
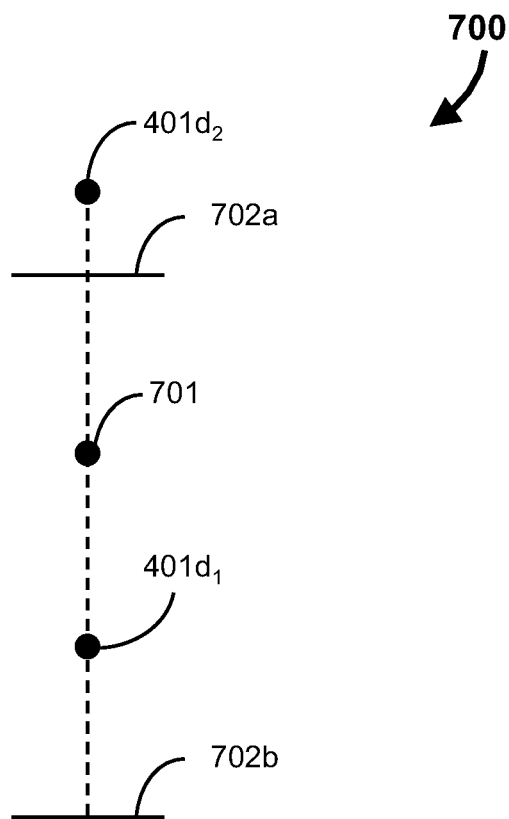
FIG. 7 is a schematic of a time window.

The time window 700 will now be explained in greater detail with reference to FIG. 7. The time window 700 of FIG. 7 includes a predetermined range above 702a and/or below 702b the current vehicle time 701 (also called the receiver time 701). As will be explained below, the predetermined range may vary and more specifically, may expand as the receiver time increases. When the timestamp 401d of the wireless signal 401 falls inside the time window 700 by falling between the upper boundary 702a and the lower boundary 702b, then the timestamp 401d of the wireless signal 401 is valid. Timestamp $401d_1$ is valid whereas timestamp $401d_2$ is invalid.

The time window 700 accounts for errors in time-keeping of the vehicle timer and the fob timer. These errors also referred to as "skew" or "clock skew" or "timer skew" Under ideal conditions, the receiver timer (which is located in the vehicle 215) and the fob timer 314 would be perfectly synchronized and thus the timestamp 401d of the wireless signal 401 would match (after accounting for propagation time of the wireless signal 401 from the key fob 203 to the vehicle 215) the receiver time (i.e., the vehicle time). The wireless signal 401 propagates at the speed of light and thus for practical purposes, the time-of-flight of the wireless signal 401 can be ignored. In other application, such as where the wireless signal 401 is transmitted over a network (such as the cellular network 201), the time window 700 may need to account for network latency. In these cases, the receiver timer adds a latency time to the timestamp, then performs the disclosed methods on the combined timestamp and latency time (i.e., the sum of the timestamp generated by the key fob 203 and latency time calculated by the vehicle 215 are treated as the new timestamp and the new timestamp is compared to the time window 700). The latency time is variable and can be determined using known techniques.

Under normal conditions, however, the receiver timer (i.e., the vehicle timer) and the fob timer 314 will drift or skew due to sources of error or skew including constant clock errors and non-constant clock errors. The time window 700 compensates for non-constant clock errors by enabling authentication of a wireless signal 401 having a timestamp 401d that is similar (i.e., close enough) to the receiver time (i.e., the vehicle time). The vehicle 215 and/or the fob 203 are programmed to substantially eliminate the constant clock errors.

The calculation of the time window 700 will now be described with reference to FIGS. 5a, 5b, and 6. As stated above, the time window 700 may vary and more specifically, may increase over time to account for a scenario where the fob timer is running faster or slower than the receiver timer for a long period of time without resynchronization (as explained below, resynchronization causes the receiver timer to reset to the timestamp 401d). As stated above, clock skew between the receiver timer and the fob timer can be separated into constant clock errors and non-constant clock errors. Constant clock errors (i.e., constant clock skew) are predictable errors that can be calculated out and thus corrected for. Constant clock errors apply to both the receiver timer and the fob timer. Non-constant clock errors (i.e., non-constant clock skew) are unpredictable variable errors that cannot be easily calculated out and corrected for. The time window 700 compensates for non-constant clock errors. Non-constant clock errors apply to both the receiver timer and the fob timer.

Constant clock errors: Both of the receiver timer and the fob timer include a timebase, which is either a crystal or an oscillator circuit providing a constant frequency signal. When the crystals or circuits are manufactured, the crystals or circuits will have a range of manufacturing tolerances. The manufacturing tolerances will cause the crystals or circuits to operate at an actual frequency, which may be higher or lower than the desired frequency. FIG. 5a shows the fob time 502a and the receiver time 503a diverging from the actual time (the horizontal axis). This divergence can be due to the constant clock errors. Note that the difference between the receiver time 503a and the fob time 502a increases with time.

The constant clock errors can be eliminated via suitable software or programming. More specifically, the fob timer and the receiver timer are tracked after manufacturing under similar ambient conditions (e.g., temperature). The tracking can involve accelerating each of the oscillators to increase the magnitude of the constant clock errors. One of the fob timer 314 and the receiver timer is then programmed to match the other of the fob timer 314 and the receiver timer. For example, if, due to manufacturing tolerances, the constant clock error of the fob timer is +3 ppm and the constant clock error of the receiver timer is –5 ppm, then the fob timer can be programmed to subtract 8 ppm per second, the receiver timer can be programmed to add 8 ppm per second, or the fob timer can be programmed to subtract 3 ppm per second and the receiver timer can be programmed to add 5 ppm per second. This programming can be automatically enforced via a paring process between the fob timer and the receiver timer. The remainder of this disclosure assumes that the constant clock errors have been substantially eliminated via suitable programming.

Non-constant clock errors: Returning to FIG. 5a, the fob time 502a and the receiver time 503a (after accounting for the constant clock errors) now diverge due to non-constant clock errors. Non-constant clock errors are due to variable conditions such as temperature variations, voltage fluctuations, and age of hardware. Because non-constant clock errors shift due to unpredictable conditions, non-constant clock errors cannot be practically eliminated via suitable programming.

Figure 5A:
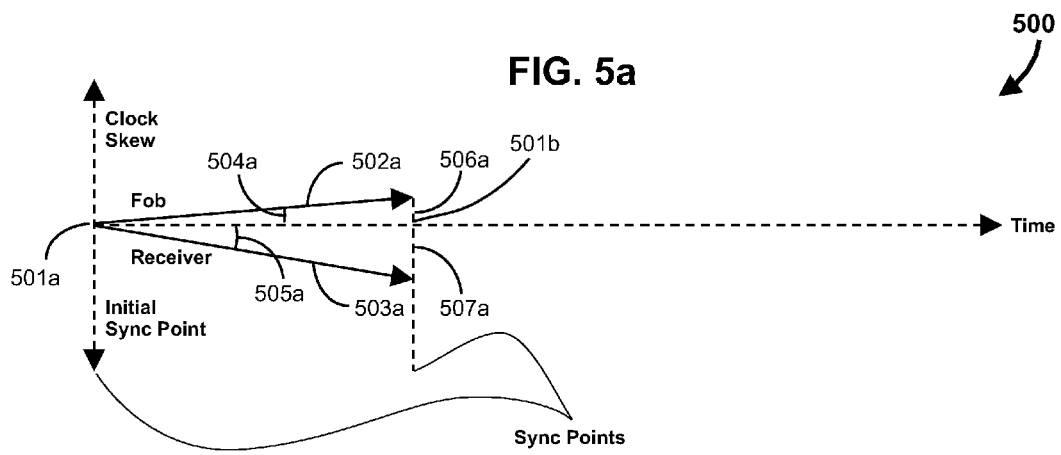
FIG. 5a is a schematic showing clock skew between the key fob and the vehicle.

With reference to FIG. 5a, the fob timer and the receiver timer begin counting at time 501a. In a worst case scenario, the fob timer counts worst-case fob time 502a and the receiver time counts worst-case receiver time 503a. Worst-case fob time 502a is at a worst-case angle 504a above the horizontal, which represents actual time. Worst-case receiver time 503a is at a worst-case angle 505a below the horizontal. As discussed above, FIG. 5a is a worst case scenario where the worst-case fob time 502a and the worst-case receiver time 503a diverge by a worst-case amount per second. In practice, fob time 502a and receiver time 503a may diverge less than shown in FIG. 5a. It should thus be appreciated that the absolute value of the worst-case fob angle 504a added to the absolute value of the worst-case receiver angle 505a is the maximum (i.e., worst case) divergence angle 554a. At time 501b, the worst-case total divergence between the fob timer and the receiver timer is the absolute values of fob skew 506a plus receiver skew 507a.

Figure 5B:
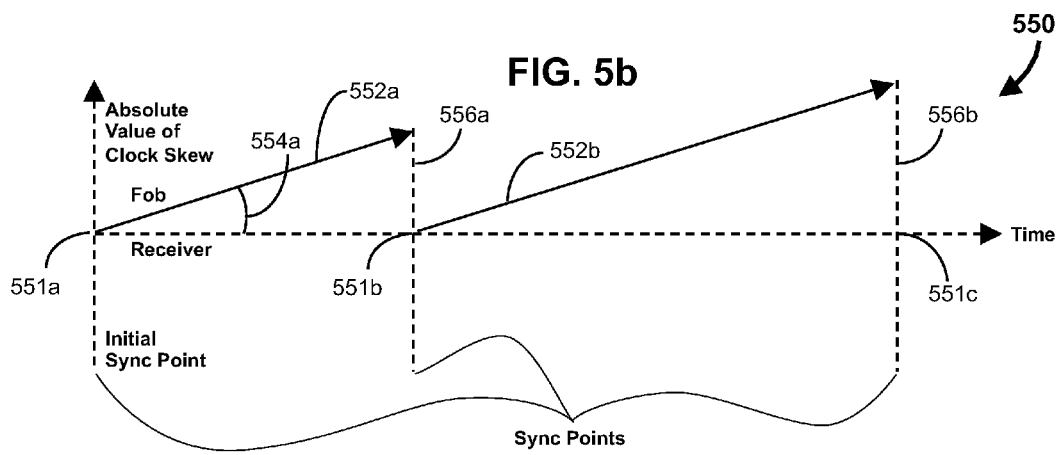
FIG. 5b is a schematic showing clock skew between the key fob and the vehicle

With reference to FIG. 5b, the receiver time is now considered to be the actual time or reference time and thus the receiver time lies along the horizontal. The vertical axis is now the absolute value of clock skew. FIG. 5b represents a worst-case scenario where the receiver time and the fob time experience the worst-case divergence discussed above.

Worst-case fob time relative to receiver time (also referred to as "worst-case fob time") 552a extends at the worst-case divergence angle 554a above the horizontal. With reference to FIGS. 5a and 5b, the worst-case divergence angle 554a is equal to the absolute value of the worst-case fob angle 504a added to the absolute value of the worst-case receiver angle 505a. At time 551b, the worst-case fob time 552a has skewed a worst-case amount of time 556a above or below the receiver time.

At time 551b, the vehicle 215 receives a valid wireless signal 401 from the key fob 203. The wireless signal 401 includes the timestamp 401d listing the current time of the key fob 203. In response, the receiver resets the receiver time to match the fob time. Thus, at time 551b, the receiver time and the fob time 552 match. This process is called resynchronization. Times 551b and 551c are resynchronization points. Time 551a is an initial synchronization point where the key fob 203 is paired with the vehicle 215.

After time 551b, the worst-case fob time 552b skews at the same worst-case angle 554a above the horizontal. As stated above, the worst-case angle 554a represents a worst case scenario where the fob time and the receiver time diverge at a maximum angle or degree. At time 551c, the fob time 552b has a worst-case skew magnitude 556b with respect to the receiver time. The worst-case skew magnitude 556b is an absolute value and therefore does not represent whether the worst-case fob time 552b is above (i.e., faster than) or below (i.e., slower than) the receiver time.

It should thus be appreciated that the time window 700 is designed to compensate for the worst-case skew (e.g., worst-case skews 556a and 556b). In some embodiments, the time window 700 is equal to twice the worst-case fob skew. FIG. 6 represents a calculation of the time window. In FIG. 6, angle 601 is the worst-case divergence angle 554a. Segment 602 is the receiver time and is measured between the most recent resynchronization point (e.g., time 551a) and a current time (e.g., time 551b). Worst-case skew 603 is the worst-case skew between the fob time and the receiver time (e.g., worst-case skew 556a or 556b). Worst-case skew 603 is equal to half of the time window 700 (i.e., the distance between 701 and 702a is equal to the worst-case skew 603 and the distance between 701 and 702b is equal to the worst-case skew 603). If the timestamp 701d is within the time window 700, then the vehicle 215 accepts the timestamp 701d.

Figure 6:
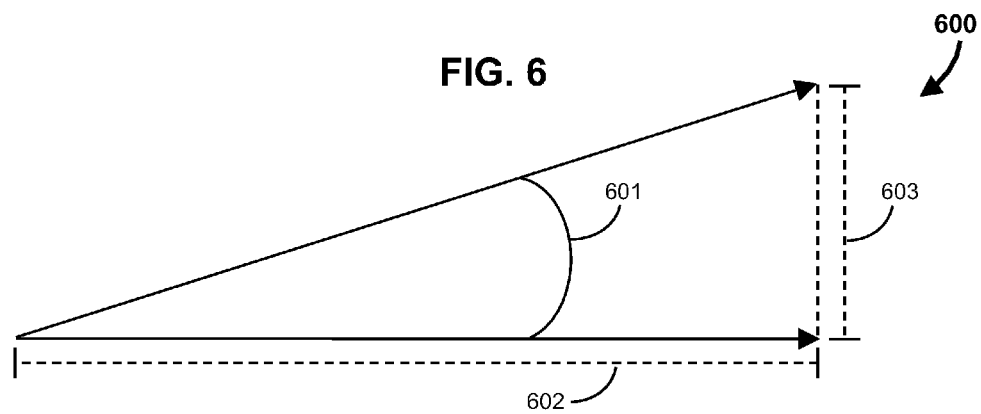
FIG. 6 is a schematic showing calculation of a time window.

Referring to FIGS. 5a and 6, and as stated above, the worst-case angle 601 is the sum of the absolute values of the worst-case fob angle 504a and the worst-case receiver angle 505a. The worst-case fob angle 504a and the worst-case receiver angle 505a are known at the time of manufacturing. More specifically, the worst-case angles 504a and 505a are empirically determined by running multiple timers under various extreme conditions (e.g., extremely high and extremely low temperatures).

Upon pairing of the key fob 203 and the vehicle 215, the vehicle 215 adds the absolute value of the worst-case fob angle 504a to the absolute value of the worst-case receiver angle 505a to determine the total worst-case divergence angle 601. When the vehicle 215 receives a wireless signal 401, the vehicle computes the time window 700 as a trigonometric function of the time elapsed since the most recent synchronization 602 and the worst-case divergence angle 601. If the timestamp 401d falls within the time window 700, then the vehicle 215 accepts the timestamp 401d. It should thus be appreciated that the time window 700 increases with the time elapsed since the most recent synchronization 602.

In various embodiments, the vehicle 215 is configured to place a hard cap on the span of the time window 700, such that time window 700 can never span more than the hard cap. The hard cap can be a function of the total worst-case divergence angle 601 and an expected maximum amount of time between resynchronization. For example, if a user expected to always use the key fob 203 to unlock the vehicle 215 once per week, then the expected maximum amount of time between resynchronization could be set as seven days. The hard cap would be computed as a function of the seven days and the worst-case divergence angle 601. In various embodiments, the vehicle 215 is configured to run an application enabling the user to select the expected maximum amount of time between resynchronization via the vehicle display.

If a hard cap is enforced and if the key fob 203 and the vehicle 215 are not resynchronized within the expected maximum amount of time between resynchronization, then there is a risk that the timestamp 401d will fall outside of the time window 700, thus resulting in the vehicle 215 rejecting the timestamp 401d. As the actual divergence angle between fob time and receiver time approaches the worst-case divergence angle 601 between the worst-case fob time and the worst-case receiver time, the chances of the vehicle 215 rejecting the timestamp 401d increase.

Two solutions are presented to resolve the problem of the vehicle 215 rejecting a timestamp 401d due to a long period of time between resynchronization. First, in various embodiments, the vehicle 215 is configured to automatically resynchronize with the key fob 203 when the key fob 203 is physically inserted into a key slot of the vehicle 215 or plugged into the vehicle 215 via a suitable wired port. Second, in various embodiments, the vehicle 215 is configured to accept any timestamp 401d of the wireless signal 401 after a predetermined acceptance amount of time expires. In other words, after the predetermined acceptance amount of time passes, the vehicle 215 authenticates all wireless signals 401 satisfying the non-timestamp criteria (e.g., key fob unique ID 401a and rolling code 401c). The predetermined acceptance amount of time may be equal to the maximum amount of time between resynchronization. The vehicle 215 may be configured to run an application enabling the user to select the predetermined acceptance amount of time via the vehicle display.

As stated above, although the above methods has been described with reference to the key fob 203 and the vehicle 215, it should be appreciated that the above methods may be applied to signal communication between any two devices in wireless or wired communication. More specifically, the method of validating an original signal by comparing a timestamp of the original signal to an expanding time window can be applied to communication between computers, mobile devices, and garage door openers.

The invention claimed is:

1. A vehicle comprising:
a receiver, timer counting time, memory, and processor configured to:
receive a timestamped signal from a fob;
compare the timestamp to a time window;
reject the timestamp if the timestamp is outside the time window;
expand the time window with the counted time; and,
compute the time window as a trigonometric function of the counted time and a predetermined angle.

2. The vehicle of claim 1, wherein the predetermined angle is a maximum divergence angle between the timer and a key fob timer due to non-constant timer skew.

3. The vehicle of claim 1, wherein the processor is configured to:
synchronize the counted time with the timestamp upon accepting the timestamped signal.

4. The vehicle of claim 1, wherein the processor is configured to:
enforce a predetermined maximum time window.

5. The vehicle of claim 4, wherein the processor is configured to:
enable user selection, via a vehicle display, of a maximum resynchronization time and calculate the predetermined maximum time window based on the user selection.

6. A vehicle comprising:
a receiver, timer counting time, memory, and processor configured to:
receive a timestamped signal from a fob;
compare the timestamp to a time window;
reject the timestamp if the timestamp is outside the time window;
expand the time window with the counted time; and,
enable user selection, via a vehicle display, of a maximum predetermined time, compare the maximum predetermined time to the counted time, and when the counted time exceeds the maximum predetermined time, accept the timestamp if the timestamp is outside the time window.

7. The vehicle of claim 6, wherein the processor is configured to: accept the timestamp if the timestamp is outside the time window only when the counted time exceeds the maximum predetermined time.

8. The vehicle of claim 1, wherein the timer includes a dedicated battery that exclusively supplies electrical power to the timer.

9. The vehicle of claim 1, wherein the processor configured to: adjust the counted time to account for constant clock skew.

10. The vehicle of claim 9, wherein the processor is configured to:
perform the adjustment according to a function learned at a time of initial pairing between the receiver and the fob.

11. The vehicle of claim 10, wherein the processor is configured to:
compare the timestamp to the time window even after adjusting the counted time to account for constant clock skew.

12. A system comprising:
the vehicle of claim 1 and the fob, which includes a fob timer counting fob time and a dedicated fob battery that exclusively supplies electrical power to the fob timer.

13. The system of claim 12, wherein the processor is configured to:
synchronize the counted time with the counted fob time upon detecting a wired connection between the fob and the vehicle.

14. A method of controlling a vehicle including: a receiver, timer counting time, memory, and processor, the method comprising, with the processor:
receiving a timestamped signal from a fob;
comparing the timestamp to a time window;
rejecting the timestamp if the timestamp is outside the time window;
expanding the time window with the counted time; and,
enabling user selection, via a vehicle display, of a maximum predetermined time, comparing the maximum predetermined time to the counted time, and when the counted time exceeds the maximum predetermined time, accepting the timestamp if the timestamp is outside the time window.

15. The method of claim 14, including:
configuring the processor to automatically account for constant timer skew from both of the vehicle timer and a fob timer.

16. The method of claim 15, including:
synchronizing the timer with the timestamp upon accepting the timestamp.

17. The method of claim 16, including:
computing the time window as a trigonometric function of the counted time and a predetermined angle.

18. The method of claim 17, wherein the computing of the time window as a trigonometric function of the counted time and a predetermined angle includes:
finding a magnitude of a worst-case skew due to non-constant clock errors between the timer and the fob timer;
setting the time window as twice the magnitude.

* * * * *